United States Patent Office 3,481,842

Patented Dec. 2, 1969

3,481,842

PROCESS FOR ELECTROPLATING LOCALIZED AREAS BY MEANS OF AN ELECTROPAINTED RESIST

Robert Keith Grassby, Ashtead, England, assignor to Ronson Products Limited, Leatherhead, Surrey, England No Drawing. Filed Aug. 1, 1967, Ser. No. 657,505
Int. Cl. C23f *17/00;* C23b *13/00;* B01k *5/02*
U.S. Cl. 204—38 9 Claims

ABSTRACT OF THE DISCLOSURE

The process disclosed relates to improvements in the preparation of articles for electroplating, for example, to provide decorative finishes, printed circuits and brass shells of cigarette lighter bodies. The article to be electroplated is masked with masking tape over the areas to be electroplated and then electropainted with a colloidal dispersion to mask the areas which are not to be electroplated. Following this, the adhesive masking tape is stripped off and the article subjected to desired electroplating procedure by a conventional electroplating process, following which the electropaint may be removed.

CROSS-REFERENCE TO RELATED APPLICATION

This application corresponds to and includes the subject matter of British provisional specification No. 35,684/66, filed Aug. 9, 1966. The applicant claims the benefit of the priority of this British application.

BACKGROUND OF THE INVENTION

Field of the invention

This invention relates to electroplating processes and is particularly concerned with a masking procedure which enables selected areas only of an electrically-conductive surface of an article to be electroplated, to be exposed for such plating.

Description of prior art

In the electroplating art it is known to utilize masking techniques employing masking tape or spraying for protecting areas from attack by the electrolyte to be used. Such techniques are described in publications relating to electroplating, but in many cases, the masking materials do not provide adequate protection or enable one to handle the articles as may be necessary for later finishing operations. In accordance with the present invention, a mask is provided by electropainting, which is strongly resistive both to acid and alkaline electrolytes and also to cleaning solutions. The mask is also sufficiently abrasion resistant to enable the article to be hand finished. With respect to "electropainting," reference is made to a book under this title by R. L. Yeates, published by Robert Draper. This book describes the advantages, basic principles and procedures, as well as the historic background and technology of electropainting. It also includes numerous references to patents and literature.

SUMMARY OF THE INVENTION

The present invention contemplates that those areas of the article that are to be electroplated are initially masked by the application of an electrically non-conductive material such as a suitable masking tape or, for example, cellulose paint. The article is then subjected to an electropainting process in which the article is immersed in a water electropaint emulsion, the article forming one electrode and either the paint container itself or a separate electrode suspended in the container forming the other electrode of an electric circuit through which current is passed during the painting operation. Such a painting process forms a uniform non-porous and water-repellant, resistive coating on all parts of the surface of the article which are electrically conductive and which have not been masked by the non-conductive masking material. After this painting operation has been completed, the article is partly stoved, after which the original non-conductive masking material, such as the masking tape, is removed.

It may be desired that the electropaint mask shall itself remain as part of the finish of the article after subsequent electroplating, in which case the stoving is completed after removal of the non-conductive masking material to cure the electropaint. In other cases the stoving is completed only to an extent which permits the electropaint to be subsequently removed, for example, after the electroplating operation.

The article is then, with the first masking removed, subjected to the desired electroplating process during which those parts of it which were masked initially will become plated and following the completion of this plating process the electropaint is removed as desired by means of any suitable paint stripping process.

In some circumstances, for example when treating an article having a surface of gold, it is possible that the electropaint may spoil the surface finish by causing erosion or pitting. To prevent this it has been found desirable initially to provide the article with a flash coating of copper of about half to one-thousandth of an inch thick.

The improved masking process of this invention has wide industrial applications including the production of decorative finishes and also the manufacture of printed circuits, particularly in connection with the electroplating of specialized components such as gold contacts on an existing printed circuit board prepared otherwise by conventional methods.

DESCRIPTION OF THE PREFERRED EMBODIMENTS

By way of example to illustrate the method of this invention, gold-plated brass shells of cigarette lighter bodies were provided with a relief pattern of electro-deposited silver in accordance with the following:

The gold-plated shells were provided with a flash coating of copper by a conventional electroplating process with a maximum flash time of 10 seconds. The areas of the shells to be silver-plated were then initially masked by applying an adhesive masking tape. The shells were then suspended in a paint container containing a red oxide primer electropaint as a 3:1 water-paint emulsion. The electropaint used was a colloidal electrolyte or a dispersion stabilized by a colloidal electrolyte of comparatively low viscosity and low pigmentation, as supplied by a paint manufacturer. With the paint kept at room temperature, the shells were made the anode of a D.C. circuit at a potential of 60 volts. The shells were removed from the container to complete the painting operation 30 seconds after the current fell to zero, were rinsed in running water and then partly stoved in a heated cabinet. The adhesive masking tape was stripped off, and the shells then stoved for forty minutes at 350° F. Any adhesive left on the shells by the masking tape was next removed using a solvent cleaner, and the copper flash coating was dissolved off the shells in a cyanide N-strip. The shells were then silver-plated by a conventional electroplating process and finally the electropaint masking removed using a liquid paint stripper. Final polishing and finishing of the shells may be undertaken as required.

The flash coating of copper is provided to prevent pitting under certain conditions and may have a thickness of from 0.25 to 0.5 x $10^{-3}$″. In the example, one red electropaint was mentioned, but it is to be understood that other electropaints may be used as a water-paint emulsion in the ratio of from 1:1 to 4:1.

The use of masking tape as described in connection with the above example would only be used where the final definition is not too detailed or intricate. In other cases, it is advantageous to initially mask the article with a photoresist of well-known type and applied in a well-known manner. The light-sensitive material is applied to the article as a solution, dried and then exposed to actinic radiation through a photonegative or other pattern, so that the required resist pattern is produced after development and washing, which covers the areas to be electroplated. It was found that after the electropaint had been applied to the article provided with photoresist pattern and cured, the resist coating had also been cured to an extend which rendered it difficult or impossible to remove by the usual solvents. Accordingly, a 20% caustic soda solution was used to remove the photoresist pattern, but this was found to in no way harm the electropaint mask on the article.

The term "photoresist," as is known, refers to a protective stencil formed by selective insolubilization of a suitable material sensitive to light, so as to protect the underlying surface against the action of physical, electrical or chemical attack, for example. During exposure to actinic radiation, the light-sensitive material becomes less soluble and the unexposed sections can easily be removed by a solvent leaving a relief image on the support. Dichromated colloids, such as dichromated polyvinyl alcohol may be used as the "photoresist."

I claim:

1. In a process for electroplating articles having an electrically conductive surface area only a predetermined portion of which is to be electroplated, in which a masking matreial is applied to the part of the area not to be electroplated and then electroplating a metal on said predetermined portion of the area of the electrically conductive surface, wherein the improvement comprises the steps of initially applying an electrically non-conductive masking material to and covering said predetermined portion of the area to be electroplated, electropainting the remainder of said surface area with an electropaint material to provide a layer on said remaining area, curing the layer of electropaint to provide a protective coating on said remaining area adapted to withstand the chemicals of electroplating solutions, subsequent finishing and handling, removing said initially applied masking material and electroplating a metal on said predetermined portion previously covered by the initially applied masking material.

2. The process as claimed in claim 1, wherein the cured layer of electropaint is electrically non-conductive, and wherein said layer is stripped from the article following the electroplating step.

3. The process as claimed in claim 2, wherein the surface of the electrically conductive area of the article is initially electroplated with a flash coating of a readily removable metal to protect said surface, and, after stripping the electropaint layer, removing the flash coating from the area previously covered by the electropaint layer.

4. The process as claimed in claim 3, wherein said flash coating has a thickness of from 0.0025 to 0.005 inch.

5. The process as claimed in claim 1, wherein the electropainting step is carried out for a period extending for approximately thirty seconds after the painting current falls to zero.

6. The process as claimed in claim 1, wherein the curing step includes the stoving and heating of the article.

7. The process as claimed in claim 1, wherein the article after removal of the initially applied masking material is subjected to a stoving operation for a period of about forty minutes at about 350° F.

8. The process as claimed in claim 1, wherein the article is a gold-plated article and wherein the metal electroplated thereon over the area previously covered by the initially applied masking is silver, thereby providing a silver relief pattern on the gold-plated article.

9. A process as claimed in claim 8, wherein the article is a gold-plated shell of a cigarette lighter body.

References Cited

UNITED STATES PATENTS

| | | | |
|---|---|---|---|
| 2,993,847 | 7/1961 | Poch | 204—15 |
| 3,303,078 | 2/1967 | Rubin | 156—150 |

HOWARD S. WILLIAMS, Primary Examiner

R. L. ANDREWS, Assistant Examiner

U.S. Cl. X.R.

204—181